US009047100B2

(12) United States Patent
Jazdzewski et al.

(10) Patent No.: US 9,047,100 B2
(45) Date of Patent: Jun. 2, 2015

(54) ABSTRACT SYNTAX TREE TRANSFORMATION

(75) Inventors: Charles P. Jazdzewski, Redmond, WA (US); Michael C. Fanning, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 727 days.

(21) Appl. No.: 13/329,138

(22) Filed: Dec. 16, 2011

(65) Prior Publication Data

US 2013/0159976 A1 Jun. 20, 2013

(51) Int. Cl.
G06F 9/44 (2006.01)
G06F 9/45 (2006.01)

(52) U.S. Cl.
CPC ...................... G06F 8/443 (2013.01)

(58) Field of Classification Search
None
See application file for complete search history.

(56) References Cited

U.S. PATENT DOCUMENTS

| 7,958,493 | B2 * | 6/2011 | Lindsey et al. | 717/117 |
|---|---|---|---|---|
| 8,533,669 | B2 * | 9/2013 | King et al. | 717/111 |
| 8,555,250 | B2 * | 10/2013 | Fanning et al. | 717/120 |
| 8,719,771 | B2 * | 5/2014 | Ovadia et al. | 717/105 |
| 8,789,018 | B2 * | 7/2014 | Fanning et al. | 717/123 |
| 8,869,106 | B2 * | 10/2014 | Jazdzewski et al. | 717/114 |
| 2006/0200807 | A1 * | 9/2006 | Bates et al. | 717/129 |
| 2007/0234288 | A1 * | 10/2007 | Lindsey et al. | 717/117 |
| 2008/0134142 | A1 | 6/2008 | Nathan et al. | |
| 2008/0178149 | A1 * | 7/2008 | Peterson et al. | 717/110 |
| 2009/0024986 | A1 | 1/2009 | Meijer et al. | |
| 2009/0064091 | A1 | 3/2009 | Tonkin et al. | |
| 2010/0269095 | A1 | 10/2010 | King et al. | |
| 2011/0078651 | A1 * | 3/2011 | Ovadia et al. | 717/105 |
| 2011/0173597 | A1 | 7/2011 | Cascaval et al. | |
| 2012/0131547 | A1 * | 5/2012 | Muir | 717/109 |
| 2012/0311533 | A1 * | 12/2012 | Fanning et al. | 717/111 |
| 2012/0311546 | A1 * | 12/2012 | Fanning et al. | 717/136 |
| 2013/0159967 | A1 * | 6/2013 | Jazdzewski et al. | 717/114 |
| 2013/0159978 | A1 * | 6/2013 | Jazdzewski et al. | 717/129 |
| 2013/0305229 | A1 * | 11/2013 | King et al. | 717/146 |

OTHER PUBLICATIONS

Misek, J., et al., "Mapping of Dynamic Language Constructs into Static Abstract Syntax Trees," Proceedings of the 9th Int'l Conf. on Computer and Information Science [online], Aug. 2010 [retrieved Aug. 23, 2014], Retrieved from Internet: <URL:http://ieeexplore.ieee.org/xpls/abs—all.jsp?arnumber=5590990&tag=1>, pp. 625-630.*

(Continued)

*Primary Examiner* — Don Wong
*Assistant Examiner* — Todd Aguilera
(74) *Attorney, Agent, or Firm* — Kevin Sullivan; Aaron Hoff; Micky Minhas (57) ABSTRACT

The transformation of an abstract syntax tree of a dynamic language program at evaluation time in a manner that is helpful for evaluating the program. For instance, the abstract syntax tree may be altered such that metadata is attached to variables generated during execution. The tree might also be altered to force code to execute faster or more likely than would occur otherwise. This might occur so that the dynamic language program might be executed at authoring time up to a halt point that represents a point of interest to the author. Without transformation of the abstract syntax tree, the execution might have not proceeded to the halt point or might have taken a long time. Once at the halt point, the program state at the halt point may be evaluated, allowing the program to perform functions such as generating an available symbol set at the halt point.

20 Claims, 7 Drawing Sheets

(56) References Cited

OTHER PUBLICATIONS

Haldiman, et al., "Practical, Pluggable Types for a Dynamic Language", In Journal Computer Languages, Systems and Structures, vol. 35, Issue 1, Apr. 2009, pp. 48-64.

Cuadrado, et al., "Building Domain-specific Languages for Model-driven Development", In Proceedings of IEEE Software, vol. 24, Issue 5, Sep.-Oct. 2007, pp. 48-55.

Prabala, Chandrasekhar, "Dynamic Language Runtime", In White Paper of Infosys Powered by Intellect Driven by Values, Feb. 2010, 11 pages.

* cited by examiner

ABSTRACT SYNTAX TREE TRANSFORMATION

BACKGROUND

When authoring code in any given software language, it is often helpful for the author to be presented with a list of options for valid references (called "available symbol sets") that could be inserted at a particular arbitrary point in the code. Such lists are referred to as "completion lists" as they often assist the author with a list of possible choices for completing a valid expression.

Software languages may be categorized as "dynamic languages" or "static languages". A fundamental characteristic of dynamic languages is that they lack a type system. Thus, the generation of complete and accurate completion lists at arbitrary points in code for dynamic languages is a difficult problem for several reasons. Most significantly, the lack of a type system makes it difficult or impossible to resolve the type of a variable at a specific point in code by means of techniques used by language services written for strongly-typed languages such as C#.

For strong-typed languages, code editors can construct a rich code model based on supporting metadata and/or static analysis of source. For dynamic languages, the most reliable information regarding a variable type is available at runtime. It is difficult, however, to reliably execute code outside of the actual application, web site, or other runtime context. For example, it is difficult to guarantee that execution will halt at a specific point of interest to allow for the analysis to occur at that point in the processing. Furthermore, it is difficult to contrive a set of valid inputs to a specific code segment (e.g., a routine). Past implementations have used such techniques as altering the dynamic language interpreter in order to solve some of these issues.

BRIEF SUMMARY

At least one embodiment described herein relates to the transformation of an abstract syntax tree of a dynamic language program at evaluation time in a manner that is helpful when executing the program at evaluation time, such as when authoring the dynamic language program, or perhaps when verifying correctness of the authored code. As an example, the transformation may occur to attach metadata to variables that are created during execution, or force a code portion to occur faster or more likely than would occur without the transformation.

In some embodiments, this might occur so that the dynamic language program might be executed up to a halt point that represents a point of interest to the author or evaluator. Without transformation of the abstract syntax tree, the execution might have not proceeded to the halt point or might have taken a long time. Once at the halt point, the program state at the halt point may be evaluated including potentially any metadata attached as a result of the tree transformation, allowing the program to perform a variety of functions including perhaps generating an available symbol set (an example of which being a completion list) to facilitate authoring or evaluation at the halt point.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the transformation of an abstract syntax tree of a dynamic language program is described. The transformation occurs in a manner that assists in the evaluation of the program, such as when authoring the application, or perhaps when verifying the correctness of the code. For instance, the abstract syntax tree may be altered such that metadata is attached to variables generated during execution. The tree might also be altered to force code to execute faster or more likely than would occur otherwise. This might occur so that the dynamic language program might be executed at authoring time or at evaluation time up to a halt point that represents a point of interest to the author or evaluator. Without transformation of the abstract syntax tree, the execution might have not proceeded to the halt point or might have taken a long time. Once at the halt point, the program state at the halt point may be evaluated, allowing the program to perform functions such as generating an available symbol set (such as a completion list) at the halt point. An available symbol set a list of valid references for a particular arbitrary point in the dynamic language program.

Figure 1:
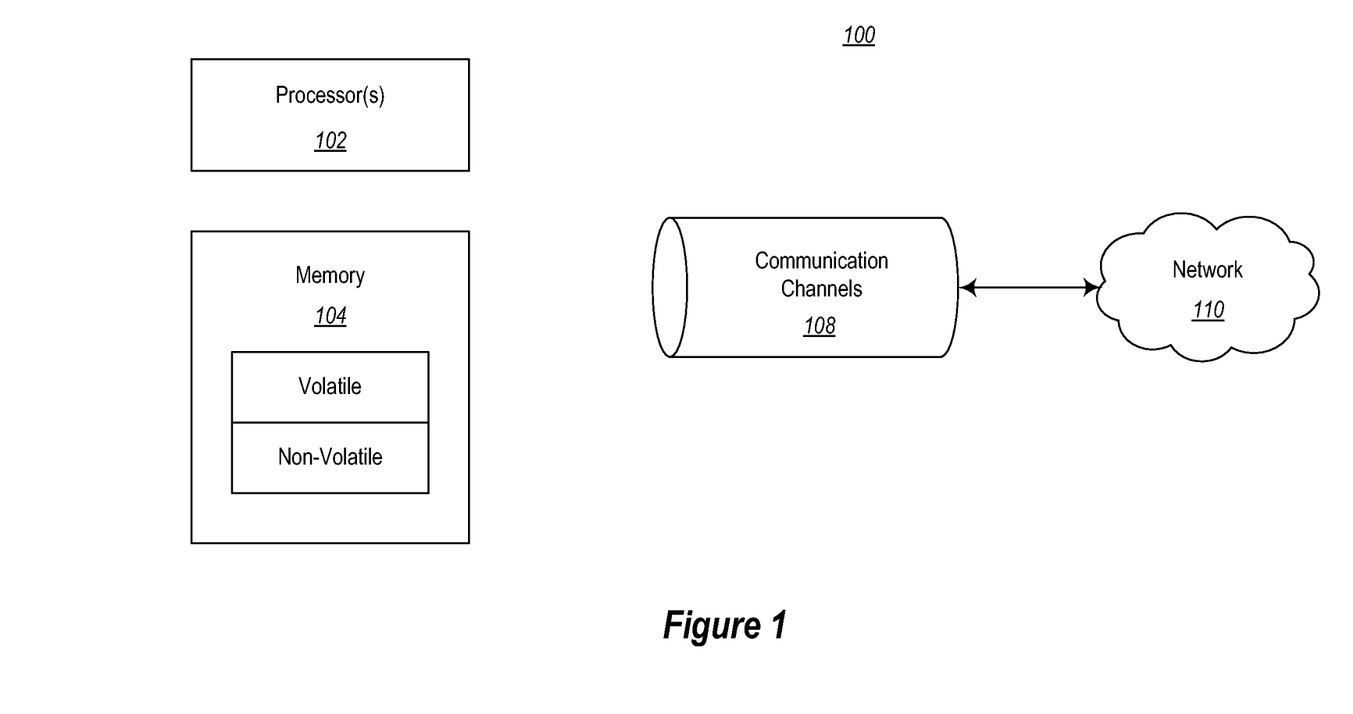
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In accordance with embodiments described herein, the authoring time transformation of an abstract syntax tree of a dynamic language program is described. Static language programs often have a well-defined type structure. In dynamic language programs, on the other hand, the type system is not well-defined, and it is often difficult to tell where a type of a variable was even established. Further, a single variable can have different types dependent on where the execution is in the code. In addition, the type of a variable at a particular location in the code may change over time in dynamic language programs. For instance, a parameter dereference may have its type changed between one or more calls. Accordingly, the analysis of a dynamic language program can prove to be quite challenging, as such dynamic language programs do not lend themselves to static analysis. Examples of dynamic language programs include scripting languages such as Javascript, Visual Basic Scripting Edition (VBScript), and many others.

The transformation of the abstract syntax tree of the dynamic language program occurs while the dynamic language program is under evaluation. As an example, the transformation may occur while the dynamic language program is still being authored, or perhaps later when the correctness of the authored code is being verified. The abstract syntax tree would naturally be changed whenever an author makes a change to the dynamic language program that is in the process of being authored. However, the transformation of the abstract syntax tree as described herein does not occur because of changes to the dynamic language program being authored, but is made to facilitate evaluation. The transformation of the abstract syntax tree occurs autonomously by the computing system to providing information useful for the authoring or evaluation of the dynamic language program.

As an example, the abstract syntax tree of the dynamic language program may be altered such that evaluation metadata is attached to a variable. Such evaluation metadata might be useful specifically for the author in the context of the dynamic language program being authored, or to an evaluator of the dynamic language program being evaluated. For instance, the metadata might describe where the type of a variable was established. Such might be particularly useful in a dynamic language program in which it is not always clear at all where a type of a variable was defined, or in which the type of a variable at a particular code location may change over time. Thus, for any given point in execution, the metadata would describe where the type of the variable was last defined.

As another example, the abstract syntax tree might be altered to facilitate the formulation of an available symbol set (such as a completion list) at any given arbitrary point in the dynamic language program in the case in which the available symbol set is generated by actually executing the dynamic language program up to the given arbitrary point. The advent of completion lists in code editors has proven to be a significant boost to developer productivity. In strongly-typed languages such as C#, users can generate a pop-up completion list at arbitrary code points that contains an extremely accurate list of available object members (when dereferencing a variable), namespaces (when constructing using statements), globally available static types, and so forth. In strongly-typed languages, often such completion lists can be generated using static analysis of the code, such as source code, compiled code, and additional metadata. For example, the assembly metadata and the compiled intermediate language instructions of managed code may be evaluated.

And, in fact, executing code directly brings about several issues that are significant complicating factors. First, it is difficult to reliably create an execution context (also called herein an "application context") that matches conditions in play during actual program execution. It is also difficult to insure that code execution halts at arbitrary code positions, or that code execution will halt in a timeframe that is reasonable to support the code editing user experience, where responsiveness should be on the order of milliseconds. There are security and sand-boxing concerns as well, as users can acquire and open untrusted code in the editor (such as samples acquired from the internet). The novel principles described herein assist in all of these challenges.

Figure 2:
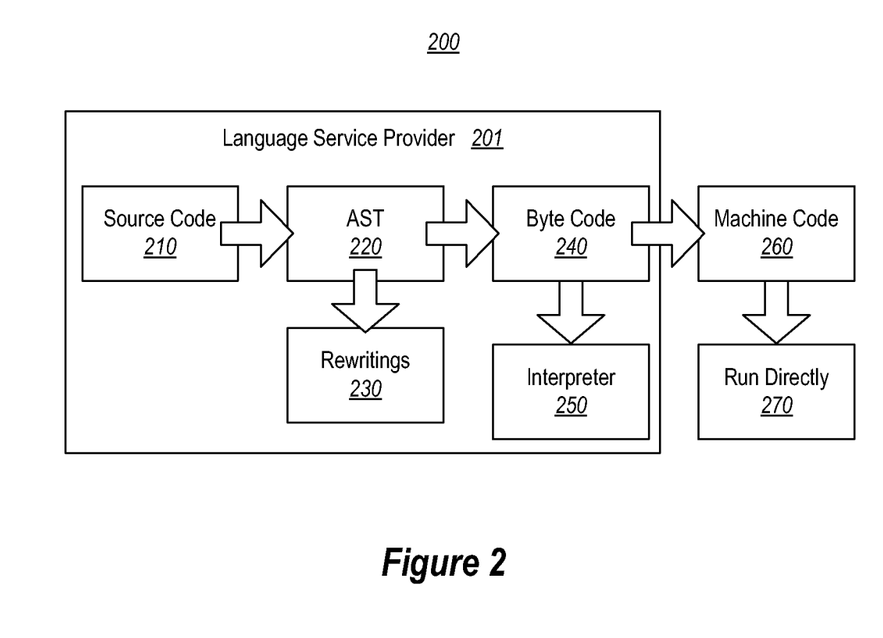
FIG. 2 illustrates an environment that includes a language service provider.

FIG. 2 illustrates an environment 200 that includes a language service provider 201. The environment 200 also shows a certain flow in which some actions and program representations are handled within the language service provider 201, and some actions are handled outside the language service provider 201.

The language service provider 201 begins its analysis with source code 210 of a dynamic language program being authored in its current authoring state (hereinafter referred to as the "current dynamic program"), whether the authoring state represents a point in the process of authoring, or even after authoring, when the correctness of the code is under evaluation. The source code 210 may include the application context as well that gives a description of the actual runtime in which the dynamic language program is anticipated to be executed. More regarding this will be described with respect to FIG. 7 further below. Suffice it to say, for now, that there is more information regarding the runtime environment to allow for more accurate approximation of the actual execution environment in which the dynamic language program would be executed if deployed in its current state.

In some embodiments, the dynamic language program represents just one code segment in a dynamic code sequence. In that case, the application context provides information describing the position of the dynamic language program in the sequence as described below. Furthermore, to improve efficiency of execution, the language service provider 201 may have captured an execution state of the dynamic code sequence prior to execution of the dynamic language program. In that way, when the dynamic language program is to be re-executed, rather that execute all code segments in the dynamic code sequence prior to executing the dynamic language program, the language service provide may set the execution state to be that prior captured state, and then immediately execute the dynamic language program. In addition to the dependency information of the dynamic code sequence, the captured execution state may be included within the application context.

The source code (along with its application context) is at least partially converted into an abstract syntax tree 220. An abstract syntax tree is a tree representation of the syntactic structure of the corresponding source code. Typically, each node in the abstract syntax tree represents a construct of the source code. For any given parent node (corresponding to a parent construct) that has children nodes (corresponding to children constructs), the children construct is a component construct within the parent construct, wherein the child construct and the parent construct have a particular relationship. Abstract syntax trees are known in the art, and thus will not be described in further detail herein. The definition of the term "abstract syntax tree" as used herein is not intended to differ from the ordinary and customary meaning of that term in the art.

However, unlike conventional abstract syntax trees, the abstract syntax tree 220 is subject to transformation by rewriting 230. Examples of such rewriting are provided in further detail below. The rewriting of the abstract syntax tree may occur before attempting to execute the current dynamic program in its current authoring state. Alternatively or in addition, the rewriting of the abstract syntax tree may occur after attempting to execute the current dynamic program. For instance, it might be faster and/or simpler to determine whether the abstract syntax tree should be rewritten based on the results of execution. For instance, if a halt point is designated at which execution should stop to generate an available completion list, and if execution is taking a long time to reach that halt point, then that might indicate that rewriting of the abstract syntax tree is warranted.

The abstract syntax tree, whether transformed or not, may then be converted to byte code 240 and interpreted 250 by the language service provider 201. The language service provider 201 detects when execution reaches the halt point and constructs an available symbol set by analyzing program state at the halt point. The halting capability might be provided by a hook in the execution engine and/or using existing debugging services/capabilities provided alongside or as part of the execution engine.

Optionally, the byte code 240 may be converted to machine code 260, and such machine code 260 provided as output from the language service provider 201. The byte code 260 may then be directly executed 270 by the environment 200 outside of the language service provider 201 up to the halt point so that the available symbol set may be constructed by analyzing program state at the halt point.

The environment 200 may be implemented by, for example, the computing system 100 of FIG. 1. For instance, the computing system 100 may have access to a computer program product that includes one or more computer-readable media or computer-storage media that has thereon computer-executable instructions that are structured such that, when executed by the processor(s) 102 of the computing system, cause the computing system 100 to provide all or portions of the environment 200.

Figure 3:
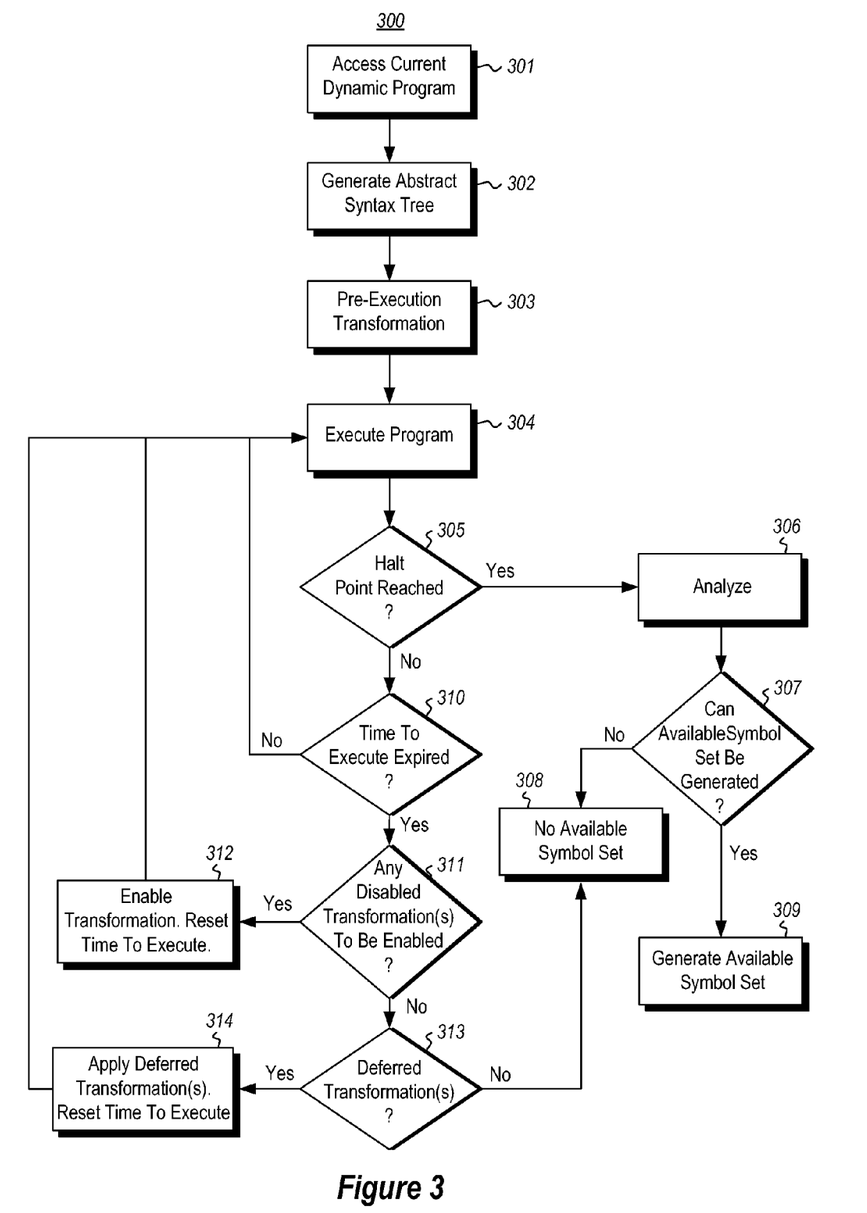
FIG. 3 illustrates a flowchart of a method for facilitating authoring of a dynamic language program by transforming an abstract syntax tree.

FIG. 3 illustrates a flowchart 300 of a method 300 for facilitating authoring of a dynamic language program by transforming an abstract syntax tree. As a dynamic language program is being authored, the dynamic language program may be executed a number of times at different stages of the authoring process. The method 300 of FIG. 3 may be performed at each of one or more of those different stages of the authoring process. Accordingly, when discussing the method 300, reference to the dynamic language program will often use the modifier "current" (e.g., "current dynamic program") to represent that the method 300 is being performed on the dynamic language program at a particular arbitrary point in the authoring process. As the method 300 of FIG. 3 may be performed in the environment 200 of FIG. 2 (although not required), the method 300 of FIG. 3 will now be described with frequent reference to the environment 200 of FIG. 2.

The current dynamic program is first accessed (act 301). As just explained, the "current" dynamic program represents the dynamic language program as it exists at a particular arbitrary point in the authoring process. Referring to FIG. 2 as an example, the language service provider 201 accesses the source code 210. Although not required, the source code 210 may include source code as well as additional application context.

The abstract syntax tree is then generated that represents at least part of the source code (act 302). For instance, in FIG. 2, the language service provider 201 generates abstract syntax tree 220 based on the source code 210. At this point before execution, the language service provider may optionally modify the abstract syntax tree by considering the current dynamic program pre-execution (act 303). Potential reasons for such pre-execution modification of the abstract syntax tree will be described.

As a first example, a current dynamic program that is currently being authored or edited may not be entirely syntactically correct. For instance, the current dynamic program might not be parsed without some errors occurring. The language service provider may provide resilience in these cases, fixing up the code in a sensible way to permit execution to the identified specific point in the code for which the available symbol set is to be generated.

Furthermore, at this point, directed execution transformations may be made. The directed execution transformations are transformations that are made with the purpose of changing the course of execution in a determined way. Examples of further modifications that may be performed include 1) forced conditional modifications in which the abstract syntax tree is modified such that a condition on a condition statement is forced to true, 2) loop guards that force a halting of at least one loop should that loop statement take too long to executed, 3) a forced exit of a recursion in which the abstract syntax tree is modified to force an exit from a recursion faster than would otherwise occur without the modification; and 4) forced function calling in which a function might not be otherwise called without the modification.

In a particular embodiment, one or more of the directed execution transformations may be left disabled. In that case, the transformation may be later enabled without again performing an analysis of the application context to thereby later modify the abstract syntax tree. Instead, the transformation is enabled if needed. This may be particularly advantageous as it may not be necessary to ever enable the directed execution transformation. Modifying the course of execution through directed execution transformations may perhaps change the application state at the identified specific location, and thereby perhaps degrade the accuracy of the resultant available symbol set generated by analyzing that application state. Accordingly, by inserting disabled directed execution transformations before execution, the transformations may be made perhaps more efficiently, while leaving open the possibility that the directed execution will not have to be performed.

In some embodiments, numerous different types of pre-execution directed execution transformations may be made with perhaps some or even all of those directed execution transformations being disabled. For instance, suppose there were one hundred transformations that could be applied to a very large abstract syntax tree. It might be more efficient to apply all of the transformations to the tree (if possible) in a single pass, rather than traversing the abstract syntax tree one hundred times separately for each type of direct execution transformation. For instance, consider the following loop guard example (explained in greater detail below):
var 1g1=0;
while (a && transform1Enabled && 1g1++<1000))
    work( );
In this case, the global variable transform1Enabled is initially set to false (and therefore the remainder of the transformation, i.e., the comparison against 1g1, will not execute). On failing to compute a set of available references in this condition, this variable could be set to true and code executed once more. Besides potentially eliminating multiple passes over the AST, rewriting in this way would also greatly increase flexibility in terms of incrementally enabling various transformations. You could enable them at once, break them into arbitrary sets, or enable them sequentially. This could be configured by user-preferences, or other settings.

In one specific embodiment, only loop guard transformations are made at this point, and those loop guard transformations are left disabled. However, this does not preclude any other type of transformation occurring pre-execution, as mentioned above. A loop guard forces a halting of at least one loop statement should that loop statement take a long time to execute. This helps in cases in which the halt point resides within a code portion whose execution is delayed by the loop statement. The term "loop statement" is meant to refer to any statement, regardless of language, which causes a code segment to be executed multiple times. Suppose, for example, that the abstract syntax tree originally represented the following source code:
while (a)
    work( );
In other words, as long as condition a is met, then the function work will be repeatedly executed. This might prevent the halt point from ever being reached, or being reached in a timely manner. The abstract syntax tree may be modified to restrict the loop statement to a particular number of iterations.

var 1g1=0;
while (a &&__1g1++<1000)
    work( );

This may be referred to as a "loop guard" (represented as 1g1 in the example) since the modification limits the number of times that the while loop repeats.

Other than syntactical corrections, or directed execution, there may be other reasons to modify the abstract syntax tree even prior to execution. For instance, the abstract syntax tree of the dynamic language program may be altered such that authoring-time metadata is attached to a variable. Such authoring-time metadata might be useful specifically for the author in the context of the dynamic language program being authored.

For instance, the metadata might describe where the type of a variable was declared. However, a tracking value is generated earlier. If the variable is accessed but does not contain a value that would generate a useful completion list (that is, it is null or undefined), and there is a metadata comment as described above, then a tracking value is created instead. It is treated during execution as the original value (either null or undefined) but is recognized by the completion list generating code as a containing a value that should be used instead of the null or undefined. In this case, the abstract syntax tree could be modified to attach a value that is set once the variable definition is encountered during execution.

Once appropriate modification, if any, has occurred, the current dynamic program is executed (act 304). Referring to FIG. 2, execution of the current dynamic program is represented by action 250 in which case the byte code 240 is interpreted, or action 270 in which the machine code is directly executed by the environment 200 outside of the language service provider 201.

If, during execution (act 304), a halt point is reached ("Yes" in decision block 305), then the state of the current dynamic program may be analyzed as it exists at the halt point (act 306). In some cases, an available symbol set might not be able to be generated based on such analysis ("No" in decision block 307), in which case no available symbol set is generated (act 308). However, in some cases, and it is hoped most cases, an available symbol set can be generated based on such analysis ("Yes" in decision block 307), in which case the available symbol set is generated (act 309). In some embodiments, the language service provider may use the application context of the dynamic language program in order to generate the available symbol set.

If, during execution (act 304), a halt point is not yet reached ("No" in decision block 305), and the time to execute has not yet expired ("No" in decision block 310), then execution continues (act 304). If, during execution (act 304), a halt point has not been reached ("No" in decision block 305), and the time to execute has expired ("Yes" in decision block 310), then this indicates that execution may be taking too long to reach the halt point. The expiration timing may be a fixed amount of time that is already determined at the time that execution begins, or it may be a time that is adjusted as execution proceeds. The expiration time might be user configurable.

Accordingly, at this point ("No" in decision block 305, and "Yes" in decision block 310), if there are directed execution transformations that are not enabled ("Yes" in decision block 311), then the directed execution transformations are enabled and the execution time is reset (act 312). For instance, in the case where the loop guards transformations were performed prior to execution (act 303), but were left disabled, those loop guard transformations may now be enabled (act 312). Execution may then be reattempted (act 304) with the aim to reach the halt point ("Yes" in decision block 305) before execution time expires ("Yes" in decision block 310).

If, however, time expires again ("Yes" in decision block 310), and if there are no further opportunities to enabled more disabled directed execution transformations ("No" in decision block 311), it is determined whether there are any deferred transformations that are to be applied to the abstract syntax tree (decision block 313). If there are no such deferred transformations ("No" in decision block 313), then the available symbol set is not generated (act 308). If there are such deferred transformations ("Yes" in decision block 313), then the abstract syntax tree is modified at that time, and the execution time is reset (act 314). For example, any of the example directed execution transformations enumerated above (such as forced conditionals, loop guards, forced recursion exit, or others) may be performed at act 314 instead of or in addition to being performed pre-execution at act 303. In one example, the loop guard transformations are added pre-execution, but disabled, and forced conditionals are deferred to act 314. This process continues until either no available symbol set is generated (act 308) or until an available symbol set is generated (act 309) (which it is hoped would be more common). Then execution is reattempted at act 304.

Figure 4:
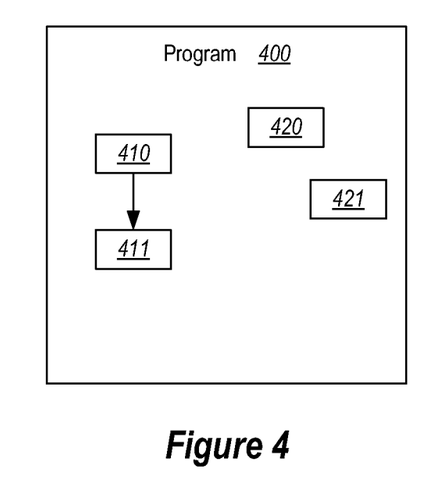
FIG. 4 shows a current dynamic program that includes one or more code portions that are each is not guaranteed (at least not within a given timeframe) to execute given the corresponding abstract syntax tree.

FIG. 4 shows a current dynamic program 400 (e.g., a current state in an authoring of a dynamic application program) that includes one or more code portions that are each is not guaranteed (at least not within a given timeframe) to execute given the corresponding abstract syntax tree. For instance, the current dynamic program might include a conditional statement 410 that directs execution to code portion 411 if a condition is met. If the condition is not met at the time execution reaches the conditional statement 410, then the code portion 411 will not be executed in the current execution of the current dynamic program if the conditional statement 410 is not again encountered during execution. As an additional example, code segment 420 might be a loop statement or a recursion that might cause execution of code portion 421 to be delayed or never performed. Thus, if the halt point were within the code segments 411 or 421, then execution might not ever reach the halt point, or might be significantly delayed.

In the case of current dynamic program 400, the act 304 of FIG. 3 may cause the abstract syntax tree to be modified in a manner that the halt point is guaranteed to execute, or perhaps will execute within a given timeframe that is acceptable to the author or other evaluator. Four examples will now be provided, though the broader principles described herein are not limited to these examples by any means. Furthermore, the examples are provided using a particular pseudo code language. The principles described herein are not limited to the exact type of source code, but extend to any dynamic programming language.

In a first example, the abstract syntax tree is modified such that a condition is forced on one or more conditional statements. This is helpful if a halt point resides within a code segment whose execution relies on the condition being met.

In a first instance of this first example, suppose that the abstract syntax tree originally represented the following source code:
if (a)
    b.|
In other words, if condition a is met, then code b will be run. If the condition a is not met, the code b is not run, at least not on this pass of the conditional statement. The abstract syntax tree may be modified as reflected in the following modified source code:
if (a||true)
   b.|

This forces the condition to always be true as anything OR'ed with true will be true in this particular language.

In a second instance of this first example, suppose that the abstract syntax tree originally represented the following source code:
while (a)
   b.|

In other words, if condition a is met, then code b will be run. However, if condition a is not met when execution encounters the while statement, then the code segment b will not be run. The abstract syntax tree may be modified as reflected in the following modified source code:
while (a|true)
   b.|

This forces the code segment b to be run.

In a third instance of this first example, suppose that the abstract syntax tree originally represented the following source code:

```
function a( ) {
    return f( );
    b.|
}
```

In this case, the function a will always return before code segment b has a chance to execute. The abstract syntax tree may be modified as reflected in the following modified source code:

```
function a( ) {
    f( );
    b.|
}
```

This directs execution towards code segment b.

In a second example, the abstract syntax tree is modified to force a halting of at least one loop statement as described above. This helps in cases in which the halt point resides within a code portion whose execution is delayed by the loop statement. The term "loop statement" is meant to refer to any statement, regardless of language, which causes a code segment to be executed multiple times. Suppose, for example, that the abstract syntax tree originally represented the following source code:
while (a)
   work( );

In other words, as long as condition a is met, then the function work will be repeatedly executed. This might prevent the halt point from ever being reached, or being reached in a timely manner. The abstract syntax tree may be modified to restrict the loop statement to a particular number of iterations.
while (a &&__1g1++<1000)
   work( );

This may be referred to as a "loop guard" (represented as 1g1 in the example) since the modification limits the number of times that the while loop repeats.

In a third example, the abstract syntax tree is modified so as to force an exit from at least one recursion. This helps in cases in which the halt point resides within a code portion whose execution is delayed by the recursion. Suppose, for example, that the abstract syntax tree originally represented the following source code:

```
function work ( ) {
    work( );
}
```

The abstract syntax tree may be modified as reflected in the following modified source code:

```
var rgl = 0;
function work ( ) {
    if (_rgl++ > 10) return
    work( );
    _rgl--;
}
```

This may be referred to as a "recursion guard" (represented as rg1 in the example) since the modification limits the number of levels of recursion.

In a fourth example, the abstract syntax tree is modified so as to force a function to be called wherein it might not otherwise be called. This helps in cases in which the halt point resides within the function that is to be called. Suppose, for example, that the abstract syntax tree originally represented the following source code:

```
function a( ) {
    function b( ) {
        c.|
    }
}
```

The abstract syntax tree may be modified as reflected in the following modified source code:

```
function a( ) {
    function b( ) {
        c.|
    }
    new b( );
}
new a( );
```

In order to guarantee the halt point at 'c.', the execution of both function a and function b is provoked since there might be no other global callers of this code. The two insertions of "new a( )" and "new b( )" accomplish this. The following is a second example of the code that the abstract syntax tree might originally represent:

```
var a = {
    b: 1,
    c: 2,
    add: function ( ) {
        return this.|
    }
};
```

The abstract syntax tree might be altered as represented below:

```
var a = (_o = {
    b: 1,
    c: 2,
    add: (_f = function () {
        return this.|
    })
});
f.call(_o);
```

In order to properly evaluate 'this', an actual instance of an object is to be acquired. The original syntax tree will provide an assignment but would not necessarily (at runtime) provoke execution (until someone actually referenced the 'add' member of the a variable). The inserted code effectively provokes a direct instantiation of the object under construction. In this way, the 'this' argument may be evaluated where the insertion point is indicated.

Figure 5:
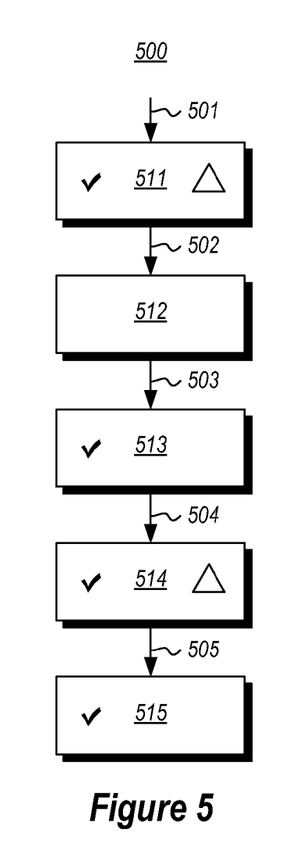
FIG. 5 abstractly illustrates, as an example, five stages of authoring between which abstract syntax tree transformation may occur.

As previously mentioned, the method 300 is performed on a "current" dynamic program representing one or potentially many stages of authoring of the dynamic language program. FIG. 5 abstractly illustrates, as an example, five stages 500 of authoring. The changes in the state of the dynamic language program are represented by arrows 501 through 505, whereas the boxes 511 through 515 represent successive states of the dynamic language program. Five successive states were chosen for FIG. 5 for simplicity only. This principles described herein are not limited to how many successive states of the dynamic language program that exist during the authoring process. Furthermore, the method 300 may be performed on the final dynamic program when evaluating correctness of code after authoring time. Generally speaking, the more complex the dynamic language program, the more states there will be during the authoring process. Regardless, the method 300 may (but is not required to) be performed on each successive dynamic program state. For instance, in the context of FIG. 5, the method 300 may (but is not required to) be performed on each successive dynamic state 511 through 515. Suppose, for example, that the method 300 is performed on states 511, 513, 514 and 515 (but not state 512), as symbolically represented by each of the four states designated with a check mark.

Of those states to which method 300 is applied, perhaps only one or some of them involve an abstract syntax tree modification. For instance, in FIG. 5, states 511 and 514 involve an abstract tree transformation as symbolically represented by the two boxes having a delta symbol therein. Accordingly, the method 300 may be applied to some or all of the successive states encountered during the authoring process, and the abstract syntax tree may be modified for some or all of the states to which the method 300 was applied.

Accordingly, the principles described herein provide for a way to modify an abstract syntax tree during the authoring process of a dynamic language program, such that completion lists may be more effectively generated to facilitate authoring. Although not required, the described language service provider 201 may operate within the framework 600 of FIG. 6.

Figure 6:
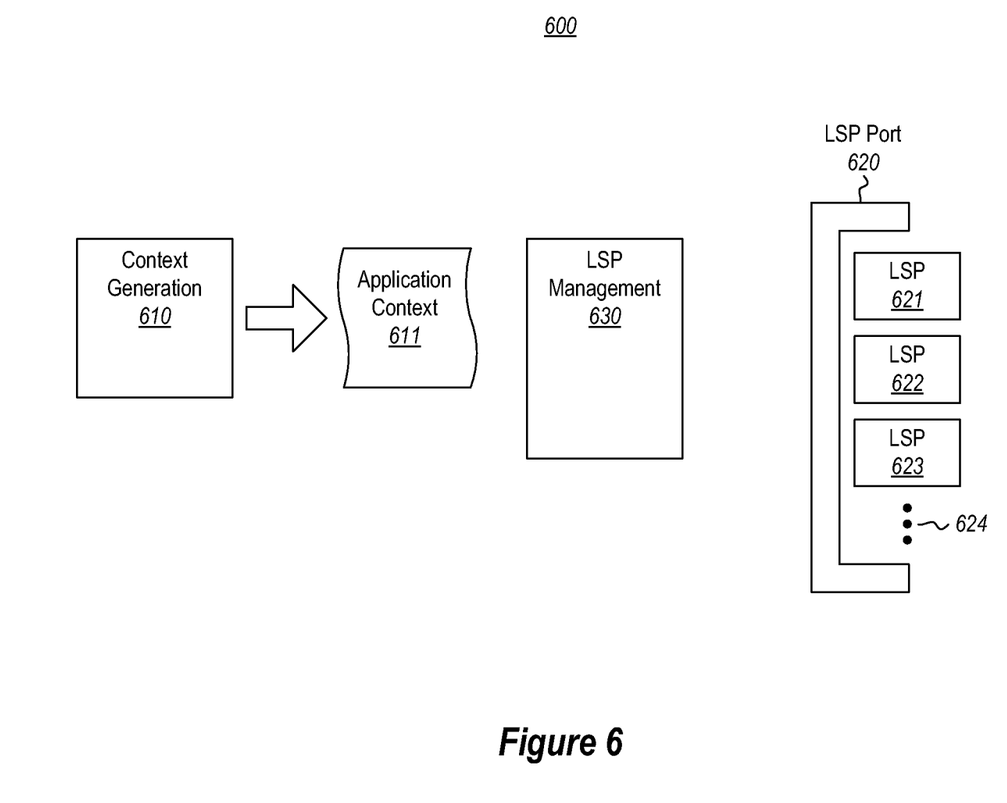
FIG. 6 illustrates a language service provider framework in which the language service provider may operate.
Figure 7:
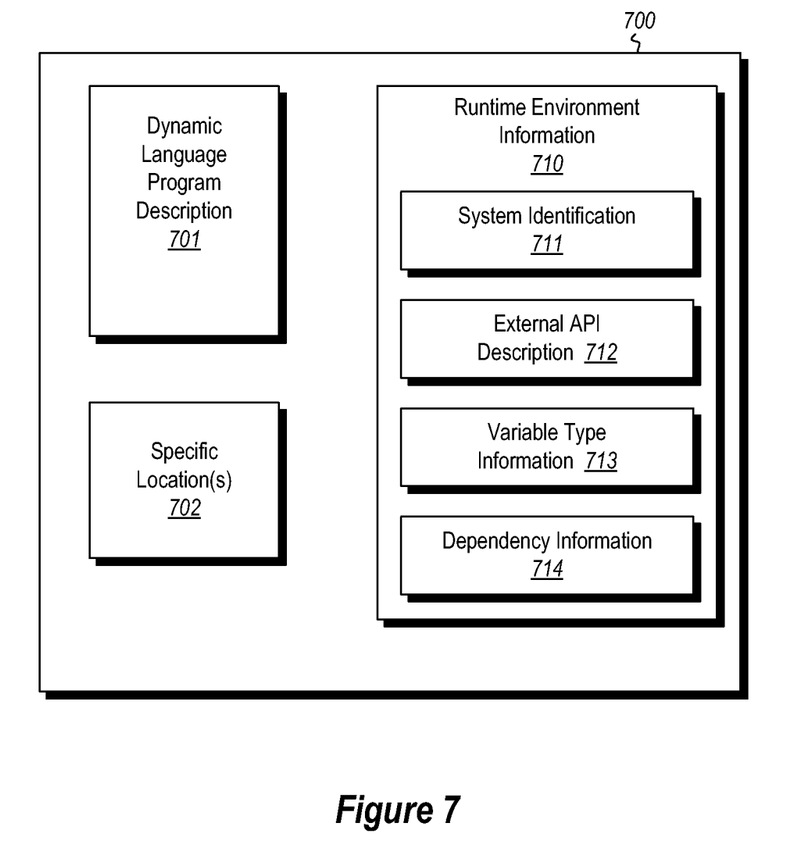
FIG. 7 abstractly illustrates an example of the application context with its various contents.

FIG. 6 illustrates a language service provider framework 600 that includes an application context generation component 610 that generates an application context 611 of a dynamic language program being authored. FIG. 7 abstractly illustrates an example of the application context 700 with its various contents. The application context 700 includes a description of the dynamic language program 701, an identifier for one or more specific locations 702 within the dynamic language program, and runtime environment information 710. In some embodiments, the elements of the application context 700 may be explicitly identified within the application context. In this way, different language service providers may interpret the schema of the application context, and provide their own processes for handling the elements of the application context.

The dynamic language program description 701 could include, for instance, the source code of the dynamic language program. The runtime environment information 710 may include system identification 711. This system identification 711 may include an operating system identifier or a browser identifier. However, the system identification might also include a set of versions of environmental software (e.g., operating system or browser) in which the dynamic language program might operate. In this case, the language service provider might provide for a common subset of available APIs (that are common to all of the versions in the set) when executing the dynamic language program. The doc type/doc mode may also be included as the application context generation component 610 may acquire this information from user configuration, or project type information corresponding to the dynamic language program. The doc mode qualifies the available API's. In this way, a new browser version can provide backwards compatibility for mark-up written against previous versions.

The runtime environment information 710 might also include a description of at least a portion of available external Application Program Interfaces (APIs) 712, and type information 713 for multiple variables in the dynamic language program.

The runtime environment 710 might also include dependency information 714 regarding whether and what execution resources the dynamic language program being authored depends on. As an example, perhaps the dynamic language program is not to be executed until another program executes.

In some embodiments, the dynamic language program description 701 may simply be the file being authored and that is currently being edited. In some embodiments, the dynamic language program description file could be the sole source of information regarding dependency information 714 or other application context used to generate an available symbol set. This could include in-source comments that describe dependencies (such as utilization of an external framework library such as JQuery), dependencies that can be determined statically from actual code (such as dynamic insertion of a <script> element with a specific URL), and/or code that dynamically loads script which cannot be statically determined (described further below).

The dynamic language program description 701 may also include other application code. Conceptually, this is code that is part of the application under development in that this application code is not an external dependency. This other application code may be in the form of files, and generally do not use special handling to acquire. This is because they are persisted and/or managed locally or as part of a storage mechanism for which the user has permissions. They also do not imply special handling in terms of security in that the code is trusted for execution. In some embodiments, application code is denoted by 1) its existence in an application project file (for environments that track project items and other configuration details in this way), 2) its presence in a specific directory/other writable location (for environments which construct a project based on the contents of a directory), and/or 3) an in-source reference to a file via a relative URL (in this case, the file should exist in the proper relative relationship wherever project files are persisted).

An application might refer to an external JS file (such as the JQuery framework). These files can be referenced in the same manner as application code, by in-source reference (as external URL), in a project file (again as an external URL), or requested during execution itself. Two related issues in files of this kind are that they are not trusted and are not internal to the machine. For these cases, the framework 600 may provide a download mechanism and potentially rewrite the source under analysis to refer to the locally cached copy. Merely requesting an external resource on the web can provoke certain types of security issues, so there may be settings and/or a user-driven approval process for performing the fetch.

There are several advantages to having these files cached locally. For instance, performance may be improved, may be made more deterministic, and this may allow more flexibility as far as sandboxing execution. The framework 600 may identify unverified files that a user has downloaded from the internet and added to the project file, in contrast with an environment in which the downloaded code is simply trusted. On NTFS file systems, these files will be marked with a bit indicating they have been downloaded from the internet, in which case the framework 600 could follow the same user experience as for untrusted code (including removing the unsafe bit from the file if the user approves).

As for implied dependencies, there are several categories of callable API that are not expressed as code that is parsed/interpreted/executed by a runtime. These include 1) DOM API, 2) other external API, and 3) surrogate code. Each will now be explained.

As for DOM API, a significant portion of JavaScript executes in a browser environment, in which the browser/script host populates the execution environment with a large body of callable API (such as the window and document objects). This API varies by browser provider, by browser version, and by document doctype/docmode. For instance, an HTML document can be authored to explicitly force the document into a specific doc mode, which implies a specific available DOM API. In some embodiments, this implied callable DOM API is expressed as JavaScript that, when executed, populates the runtime with appropriate objects/methods.

As for other external APIs, any script host has the ability to extend callable API at runtime. Many execution environments also provide interoperability mechanisms (such as web services and COM activation) with implied API. These also can be provided in the system as executable JavaScript. Thus, system identification 711 may include external APIs that are not native to the dynamic language runtime.

As for surrogate code, in some cases, for perhaps reasons of performance, convenience, or security, source code that exists and is actually parsed/executed in real world execution might be replaced by surrogate JavaScript code that can be executed in context of the language.

Absent a well-maintained and properly ordered set of in-source annotations describing a JS file's dependencies, an HTML file that consumes some JavaScript can be very helpful for determining references as well as proper ordering of file load (since any HTML file organizes its script elements properly in order for code to execute correctly). The framework 600 permits JavaScript files to provide a reference to an HTML file that consumes it in order to identify what other JS code it might depend on and in what order they should load. This can save significant developer maintenance costs. HTML also can contain embedded code (e.g., within <script> elements or as embedded script associated with event handlers) that should be extracted and passed to the language service (since a file under edit might itself depend on this code). Finally, some browsers populate the JS callable API with variables that represent HTML elements expressed in the mark-up. In Internet Explorer, for example, any div marked with an id can be referred to from JavaScript directly by that id (rather than acquiring it via getElementById). For this case, the HTML would be parsed looking for elements with an ID and then construct surrogate JS that populates the global namespace with the appropriate set of identifiers.

These categories are useful for driving user experience/configuration, potentially dictate handling in the general framework itself and could imply special handling in a language service provider. Users might configure a project for a web application as targeting only a specific version of a browser. As mentioned, the infrastructure might treat external code with more care than trusted application code. When calculating a closure of dependencies that might be in play for editing a specific file, the infrastructure might also make decisions based on these categorizations. The downloader might not aggressively parse external files, for example, for a complete closure of its possible dependencies but depend instead on the hooks in the engine to identify when that external code itself pulls in other files.

Referring to FIG. 6, the language service provider framework 600 includes a language service provider port component 620 configured to hold one or more language service providers. For instance, as illustrated, the language service provider port component 620 holds three language service providers 621, 622 and 623. However, the ellipses 624 represents that there is flexibility in how many language service providers are made available to the language service provider port component 620.

Figure 8:
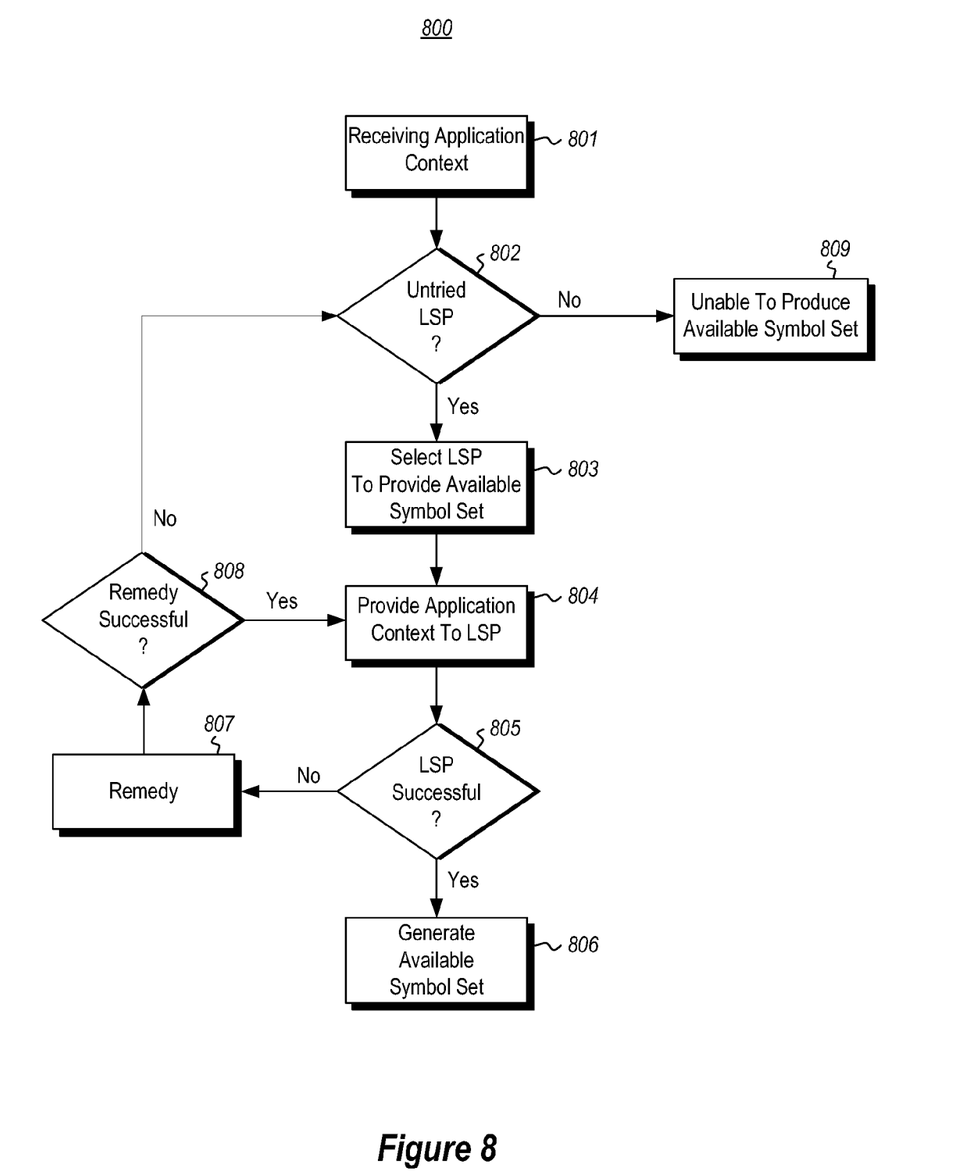
FIG. 8 illustrates a flowchart of a method for managing multiple language service providers.

The language service provider framework 600 also includes a management component 630 that is configured to manage use of the various language service providers available to the framework 600. FIG. 8 illustrates a flowchart of a method 800 for managing multiple language service providers. As the method 800 may be performed by the management component 630 of FIG. 6, the method 800 of FIG. 8 will now be described with frequent reference to the framework 600 of FIG. 6.

In accordance with the method 800, the management component receives an application context from an application context generation component (act 801). For instance, referring to FIG. 6, the management component 630 receives the application context 611 from the application context generation component 610.

If there are any language service providers that have not yet been tried ("Yes" in decision block 802), then the management component selects a language service provider (act 803) that is to provide the available symbol set. At this point, the method 800 has not yet tried any language service providers, and thus if there are multiple available language service providers, then the management component 630 selects one of those available language service providers. For instance, referring to FIG. 6, the management component 630 may choose from any of the language service providers 621, 622 or 623.

The selection of language service provider may be made based on, for example, a user preference. For instance, perhaps the user prefers to use language service provider 621. In that case, the selection may default to the language service provider 621, or at least the language service provider 621 would be weighted more heavily with other factors in the selection process that it would be without being the user default.

The selection may also be based on a default selection. For instance, perhaps language service provider 622 is selected by the management component 630 by default, absent a contrary indication by the user.

Alternatively or in addition, the selection might also be based on an evaluation of historical performance of each of the available language service providers. For instance, perhaps language service provider 621 tends to supply available symbol sets that are higher quality and in a faster time than the other language service providers 626 and 223. This excellent historical performance may be tracked by the management component 630, causing the management component 630 to select the language service provider 621 as a provider of first resort. Conversely, a language service provider that crashes might be permanently disabled or disabled for a specific file.

In some embodiments, the management component 630 might operate a language service provider in a condition in which the language service provider is prevented from performing certain actions. This is often termed "sandboxing". The management component 630 may further disable the language service provider if it attempts to perform a forbidden action. This reduces the risk posed by rogue language service providers, thereby lessening the risk of trying new language service providers. The management component 630 may also have a mechanism for removing the language service provider from the sandboxed condition once the language service provider satisfies one or more trust tests.

Once the language service provider is selected (act 803), the management component provides the application context to the selected application service provider (act 804). The selected language service provider then processes the application context with the aim to generate an available symbol set (e.g., perhaps so that the available symbol set may be used to build a completion list) corresponding to each of at least one of the one or more specific locations 702. If the language service provider is successful ("Yes" in decision block 805), then the available symbol set is generated (act 806). For instance, in FIG. 6, suppose that the management component 630 selects language service provider 621. The language service provider 621 would then process the application context provided by the management component 630, and if successful in generating an available symbol set, would provide the available symbol set to the management component 630. The management component 630 could then visualize the available symbol set (perhaps through a completion list, although not required) to the author of the dynamic language program, to assist the author in further authoring the dynamic language program.

If the language service provider is not successful in generating a satisfactory available symbol set ("No" in decision block 805), then the management component 630 may attempt to remedy (act 807). For instance, the language service provider may be considered not successful if it does not generate the available symbol set in an acceptable amount of time. If the remedy is successful ("Yes" in decision block 808), the management component may provide the application context back to the selected language service provider (act 804) to reattempt the language service provider (decision block 805). For instance, the management component 630 may then cause the dynamic language program to be rewritten in an attempt to remedy the problem prior to having the language service provider reattempt execution.

On the other hand, if the remedy is not successful ("No" in decision block 808), then another language service provider may be tried if available (decision block 802). For instance, suppose in that language service provider 621 was first attempted unsuccessfully. At decision block 802, there are still two more language service providers 622 and 623 that have not yet been tried. Thus, there are still more untried language service providers ("Yes" in decision block 802). The management component 630 then again selects one of the language service providers (suppose language service provider 622), and provides the application context to the selected language service provider (act 804). If the language service provider 622 is successful ("Yes" in decision block 805), then the available symbol set is generated (act 806). Otherwise, if the language service provider is not successful ("No" in decision block 805), and the situation is not remedied ("No" in decision block 807), then the final language service provider may be tried.

At decision block 802, there is still one more language service provider 623 that has not yet been tried. Thus, there are still more untried language service providers ("Yes" in decision block 802). The management component 630 then again selects one of the language service providers. In this case, the selection would be trivial as there is only one more untried language service provider 623. Accordingly, the management component 630 provides the application context to the selected service provider (act 805). If the language service provider 623 is successful ("Yes" in decision block 805), then the available symbol set is generated (act 806). Otherwise, if the language service provider is not successful ("No" in decision block 805), and the situation is not remedied ("No" in decision block 807), the method 800 returns to decision block 802.

However, now there are no further untried language service providers ("No" in decision block 802) at this point. Accordingly, the management component 630 is unable to generate an available symbol set (act 809). However, at this point, the management component 630 had tried three language service providers and tried to remedy the lack of success in each case. Thus, it may be a truly rare circumstance that the method 800 is unable to generate the available symbol set.

The management component 630 may perform a number of additional tasks. For instance, the management component 630 may be configured to select a fall-back ordering of the language service providers in case of a failure of one or more of the language service providers to provide acceptable symbol sets. For instance, referring to FIG. 6, the management component 630 may determine that it should first attempt generation of the symbol set using the language service provider 621, and if not successful, then language service provider 623, and if not successful, then language service provider 622.

Alternatively or in addition, the management component 630 may register new language service providers as they are added to the language service provider port component 620. Alternatively or in addition, the management component 630 may additionally search for available language service providers that could be plugged into the language service provider port component. Alternatively or in addition, the management component 630 may capture environmental state upon completion of execution of dynamic language programs.

Accordingly, the principles described herein describe a language service provider that may operate to modify the abstract syntax tree to facilitate authoring of a dynamic language program. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors, for facilitating authoring of a dynamic language program by transforming an abstract syntax tree, the method comprising:

accessing a portion of source code corresponding to a portion of the dynamic language program for evaluation;

identifying a designated halt point within the portion of source code;

generating the abstract syntax tree, which represents the portion of source code corresponding to the portion of the dynamic language program that is under evaluation;

prior to execution of the portion of the dynamic language program based on the abstract syntax tree, identifying one or more directed execution transformations that may be made to the abstract syntax tree, the one or more directed execution transformations ensuring one or both of execution to the halt point or a reduced execution time to reach the halt point;

without applying any of the identified one or more directed execution transformations, executing the portion of the dynamic language program based on the abstract syntax tree;

during execution of the portion of the dynamic language program, identifying that the halt point has not been reached and that a time to execute has expired;

based on the halt point having not been reached and the time to execute having expired, transforming the abstract syntax tree with at least one of the one or more directed execution transformations; and subsequent to transforming the abstract syntax tree with the at least one of the one or more directed execution transformations, re-executing the portion of the dynamic language program based on the transformed abstract syntax tree.

2. The method in accordance with claim 1, wherein the at least one of the one or more directed execution transformations comprises forced conditional modification, and wherein transforming the abstract syntax tree comprises:

forcing a condition on at least one conditional statement represented in the abstract syntax tree, such that the halt point is reached when the dynamic language program is re-executed based on the transformed abstract syntax tree.

3. The method in accordance with claim 1, wherein the at least one of the one or more directed execution transformations comprises creation of a loop guard, and wherein transforming the abstract syntax tree comprises:

forcing a premature halting of at least one loop statement represented in the abstract syntax tree, such that the halt point is reached more quickly when the dynamic language program is re-executed based on the transformed abstract syntax tree than when the dynamic language program was executed based on the abstract syntax tree.

4. The method in accordance with claim 1, wherein the at least one of the one or more directed execution transformations comprises forced exit of a recursion, and wherein transforming the abstract syntax tree comprises:

forcing an exit from at least one recursion represented in the abstract syntax tree, such that the halt point is reached more quickly when the dynamic language program is re-executed based on the transformed abstract syntax tree than when the dynamic language program was executed based on the abstract syntax tree.

5. The method in accordance with claim 1, wherein the dynamic language program is a scripting language program.

6. The method in accordance with claim 1, wherein the one or more directed execution transformations are selected from the group comprising: (i) a forced conditional modification, (ii) creation of a loop guard, (iii) a forced exit of a recursion, and (iv) a forced function calling.

7. A computer program product comprising one or more hardware storage devices having stored thereon computer-executable instructions that are structured such that, when executed by one or more processors of a computing system, the computer-executable instructions cause the computing system to facilitate authoring of a dynamic language program by transforming an abstract syntax tree, including at least the following:

accessing a portion of source code corresponding to a portion of the dynamic language program for evaluation;

identifying a designated halt point within the portion of source code;

generating the abstract syntax tree, which represents the portion of source code corresponding to the portion of the dynamic language program that is under evaluation;

prior to execution of the portion of the dynamic language program based on the abstract syntax tree, identifying one or more directed execution transformations that may be made to the abstract syntax tree, the one or more directed execution transformations ensuring one or both of execution to the halt point or a reduced execution time to reach the halt point;

without applying any of the identified one or more directed execution transformations, executing the portion of the dynamic language program based on the abstract syntax tree;

during execution of the portion of the dynamic language program, identifying that the halt point has not been reached and that a time to execute has expired;

based on the halt point having not been reached and the time to execute having expired, transforming the abstract syntax tree with at least one of the one or more directed execution transformations; and subsequent to transforming the abstract syntax tree with the at least one of the one or more directed execution transformations, re-executing the portion of the dynamic language program based on the transformed abstract syntax tree.

8. The computer program product in accordance with claim 1, wherein transforming the abstract syntax tree includes attaching metadata to a variable of the dynamic language program, wherein the metadata describes where the variable was defined in the portion of source code.

9. The computer program product in accordance with claim 1, wherein the at least one of the one or more directed execution transformations comprises forced conditional modification, and wherein transforming the abstract syntax tree comprises:

forcing a condition on at least one conditional statement represented in the abstract syntax tree, such that the halt point is reached when the dynamic language program is re-executed based on the transformed abstract syntax tree.

10. The computer program product in accordance with claim 1, wherein the at least one of the one or more directed execution transformations comprises creation of a loop guard, and wherein transforming the abstract syntax tree comprises:

forcing a premature halting of at least one loop statement represented in the abstract syntax tree, such that the halt point is reached more quickly when the dynamic language program is re-executed based on the transformed abstract syntax tree than when the dynamic language program was originally executed based on the abstract syntax tree prior to transformation.

11. The computer program product in accordance with claim 1, wherein the at least one of the one or more directed execution transformations comprises forced exit of a recursion, and wherein transforming the abstract syntax tree comprises:
    forcing an exit from at least one recursion represented in the abstract syntax tree, such that the halt point is reached more quickly when the dynamic language program is re-executed based on the transformed abstract syntax tree than when the dynamic language program was originally executed based on the abstract syntax tree prior to transformation.

12. The computer program product in accordance with claim 1, wherein the at least one of the one or more directed execution transformations comprises forced function calling, and wherein transforming the abstract syntax tree comprises:
    forcing a function represented in the abstract syntax tree to be called, such that the halt point is reached when the dynamic language program is re-executed based on the transformed abstract syntax tree.

13. The computer program product in accordance with claim 1, also including:
    generating an available symbol set at the halt point when it is reached.

14. The computer program product in accordance with claim 1, wherein the one or more directed execution transformations are selected from the group comprising: (i) a forced conditional modification, (ii) creation of a loop guard, (iii) a forced exit of a recursion, and (iv) a forced function calling.

15. A computer system, comprising:
    one or more processors; and
    one or more hardware storage devices having stored thereon computer-executable instructions that are structured such that, when executed by the one or more processors, the computer-executable instructions cause the computer system to facilitate authoring of a dynamic language program by transforming an abstract syntax tree, including at least the following:
        accessing a portion of source code corresponding to a portion of the dynamic language program for evaluation;
        identifying a designated halt point within the portion of source code;
        generating the abstract syntax tree, which represents the portion of source code corresponding to the portion of the dynamic language program that is under evaluation;
        prior to execution of the portion of the dynamic language program based on the abstract syntax tree, identifying one or more directed execution transformations that may be made to the abstract syntax tree, the one or more directed execution transformations ensuring one or both of execution to the halt point or a reduced execution time to reach the halt point;
        without applying any of the identified one or more directed execution transformations, executing the portion of the dynamic language program based on the abstract syntax tree;
        during execution of the portion of the dynamic language program, identifying that the halt point has not been reached and that a time to execute has expired;
        based on the halt point having not been reached and the time to execute having expired, transforming the abstract syntax tree with at least one of the one or more directed execution transformations; and
        subsequent to transforming the abstract syntax tree with the at least one of the one or more directed execution transformations, re-executing the portion of the dynamic language program based on the transformed abstract syntax tree.

16. The computer system in accordance with claim 15, wherein the one or more directed execution transformations are selected from the group comprising: (i) a forced conditional modification, (ii) creation of a loop guard, (iii) a forced exit of a recursion, and (iv) a forced function calling.

17. The computer system in accordance with claim 15, wherein the at least one of the one or more directed execution transformations comprises forced conditional modification, and wherein transforming the abstract syntax tree comprises:
    forcing a condition on at least one conditional statement represented in the abstract syntax tree, such that the halt point is reached when the dynamic language program is re-executed based on the transformed abstract syntax tree.

18. The computer system in accordance with claim 15, wherein the at least one of the one or more directed execution transformations comprises creation of a loop guard, and wherein transforming the abstract syntax tree comprises:
    forcing a premature halting of at least one loop statement represented in the abstract syntax tree, such that the halt point is reached more quickly when the dynamic language program is re-executed based on the transformed abstract syntax tree than when the dynamic language program was originally executed based on the abstract syntax tree prior to transformation.

19. The computer system in accordance with claim 15, wherein the at least one of the one or more directed execution transformations comprises forced exit of a recursion, and wherein transforming the abstract syntax tree comprises:
    forcing an exit from at least one recursion represented in the abstract syntax tree, such that the halt point is reached more quickly when the dynamic language program is re-executed based on the transformed abstract syntax tree than when the dynamic language program was originally executed based on the abstract syntax tree prior to transformation.

20. The computer system in accordance with claim 15, wherein the at least one of the one or more directed execution transformations comprises forced function calling, and wherein transforming the abstract syntax tree comprises:
    forcing a function represented in the abstract syntax tree to be called, such that the halt point is reached when the dynamic language program is re-executed based on the transformed abstract syntax tree.

* * * * *